(12) United States Patent
Frodigh et al.

(10) Patent No.: US 6,640,102 B2
(45) Date of Patent: *Oct. 28, 2003

(54) METHOD AND SYSTEM IN A MOBILE RADIO SYSTEM

(75) Inventors: Magnus Frodigh, Sollentuna (SE); Magnus Almgren, Sollentuna (SE); Håkan Olofsson, Stockholm (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 09/761,363

(22) Filed: Jan. 16, 2001

(65) Prior Publication Data

US 2001/0001762 A1 May 24, 2001

Related U.S. Application Data

(63) Continuation of application No. 09/134,027, filed on Aug. 14, 1998.

(51) Int. Cl.$^7$ ............................................... H04Q 7/200
(52) U.S. Cl. ............................ 455/436; 455/438; 455/442
(58) Field of Search ................................... 455/436, 437, 455/438, 439, 440, 442

(56) References Cited

U.S. PATENT DOCUMENTS

| | | | | |
|---|---|---|---|---|
| 5,623,535 A | * | 4/1997 | Leung et al. | 455/444 |
| 5,649,290 A | * | 7/1997 | Wang | 370/332 |
| 5,678,185 A | * | 10/1997 | Chia | 455/422 |
| 5,722,072 A | * | 2/1998 | Crichton et al. | 455/437 |
| 5,774,809 A | * | 6/1998 | Tuutijarvi et al. | 455/436 |
| 5,907,807 A | * | 5/1999 | Chavez et al. | 455/435 |
| 6,021,123 A | * | 2/2000 | Mimura | 370/331 |
| 6,246,877 B1 | * | 6/2001 | Frodigh et al. | 370/331 |
| 6,285,884 B1 | * | 9/2001 | Vaara | 455/436 |

* cited by examiner

Primary Examiner—Edward F. Urban
Assistant Examiner—Simon Nguyen

(57) ABSTRACT

The invention relates to a method of performing handover in a mobile radio system. The mobile radio system performs quality measurements on signals transmitted (300) between a mobile terminal and predetermined radio base stations. Handover is performed (301, 302, 303) when some of the measured signal strengths exceeds the signal strength for the radio base station to which the mobile terminal for the moment is set up, added to a handover value. The handover value is dependent on measured signal strengths and neighboring cell relation values. The neighboring cell relation values depend on a probability for handover to be performed from one radio base station to another radio base station in the mobile radio system.

22 Claims, 2 Drawing Sheets

METHOD AND SYSTEM IN A MOBILE RADIO SYSTEM

This application is a continuation of application Ser. No. 09/134,027 filed Aug. 14, 1998.

TECHNICAL FIELD

The invention relates to a mobile radio system which comprises radio base stations to transfer control information and message information in the form of radio information to mobile terminals. The invention particularly relates to a method in which the transmission of message information to a mobile terminal is handed over from one radio base station to another radio base station, i.e. a so called handover.

BACKGROUND OF THE INVENTION

It is desirable that a mobile radio system has a large traffic handling capacity and a high degree of coverage. The traffic handling capacity for a mobile radio system depends i.a. on the number of available radio channels and how effectively these channels can be utilized. It is known to provide several radio base stations having small coverage areas, also called cells, close to each other within a mobile radio system. Then, available radio channels can be utilized in a more efficient manner for handling traffic peaks within a restricted geographical area than if radio base stations having large coverage areas are arranged far from each other within the mobile radio system. The coverage area is the area within which a call is established. Thus, the provision of many radio base stations close to each other can increase the capacity in a mobile radio system. Two radio base stations with such overlapping coverage areas can not however normally use the same radio channel for communication with different mobile terminals which is true for e.g. mobile radio systems implemented in TDMA technology and FDMA technology.

When a mobile terminal has a communication link established to a first radio base station (below also called active radio base station and its associated cell is in analogy herewith called an active cell) and moves from the area that is covered by said first radio base station to another area which is covered by a second radio base station, a new communication link has to be established between the mobile terminal and the second radio base station. This is automatically controlled by the mobile radio system and the method is denoted handover or hand-off.

Comparatively much signaling is required in the mobile radio system in connection with handover. This means that the radio system is loaded every time handover is to be performed. Therefore, it is desirable to avoid having to perform unnecessary handovers.

Due to the presence of radio shadows caused e.g. by variations in the terrain, there can be islands in a cell belonging to one radio base station where the radio signal of the radio base station of another cell is stronger. If enough signal strength can be offered without handover being performed to such an island, it is disadvantage to perform such a handover. If handover is avoided to said islands, the signaling in a radio system is reduced and thereby a lower load on the mobile radio system is obtained.

In U.S. Pat. No. 4,718,081 an apparatus and a method are described for performing handovers. The object of the method is to avoid performing handovers to radio base stations which would not be optimal to perform handovers too. Signal strength measurement is carried out on handover candidate radio base stations and their neighboring radio base stations. Candidate radio base stations are the radio base stations to which it is possible for a mobile to perform a handover to if needed. Neighboring cells to a cell are the cells that surround this cell. A calculation of a weighted average value of measured signal strength for candidate radio base station and its neighboring radio base stations is carried out for all candidate radio base stations. The signal strength of the neighboring radio base stations are multiplied by a weight factor preferably equal to 0.5 in the calculation. The calculated weighted average values for the candidate radio base stations are compared. The radio base station having the highest weighted average value is selected to handle an ongoing call.

BRIEF DESCRIPTION OF THE INVENTION

The present invention is based on the insight that, by taking into consideration how a second radio base station that possibly will take over a mobile call (handover) from a first radio base station, is related to the (other) radio base stations that are neighboring base stations to said first base station, it is possible to avoid unnecessary handovers when an island is present that is so located that it is not suitable to perform handover to the base station that has given rise to this island.

An object of the present invention is, thus, to avoid handovers in areas where radio communication signals are received with high signal strength (or where any other signal quality measure that is used to judge when handover is to take place, has a high value) from a radio base station that is far from said areas. Fewer handovers reduce the load on the radio system and also the risk for ongoing calls to be cleared down. This also leads to that the system will be less exposed to disturbances since the number of mobile terminals that are set up to the base station and that at the same time are far from the radio base station, is reduced.

This is attained by the present invention in that handover of a mobile terminal is performed from a first radio base station to a second radio base station when a first quality value, corresponding to a measured quality measure of a radio signal that has been transferred between the second radio base station and the mobile terminal, exceeds the same quality measure of the signal from the first radio base station added to a handover value that is dependent on a measured quality value of a radio signal that has been transferred between a further radio base station and the mobile terminal and a value on a neighboring cell relation (below called relation value).

An advantage of the present invention is that the number of handovers in the mobile radio system on an average is reduced which reduces the load on the mobile radio system.

The invention will now be described more in detail by means of preferred embodiments with reference to the appended drawings.

PREFERRED EMBODIMENTS

Figure 1:
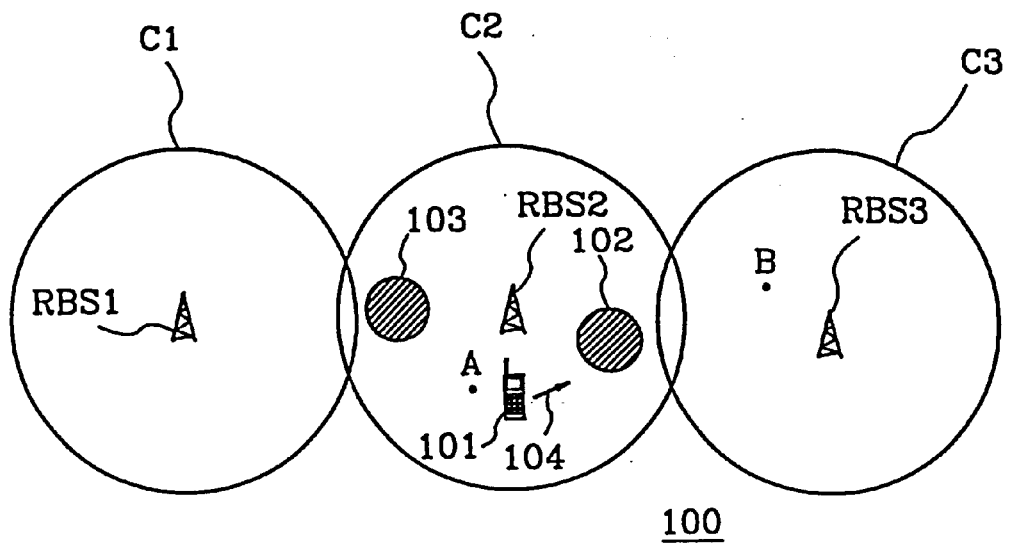
FIG. 1 shows a mobile radio system designed with three cells.

In FIG. 1, a mobile radio system is shown, comprising mobile terminals and radio base stations having transmitters and receivers for radio signals. For reason of simplicity, only one mobile terminal 101 is shown. When the quality on a connection link between a radio base station and a mobile terminal is below a predetermined value, the mobile radio system has the possibility of assigning a new connection link between another radio base station and the mobile terminal 101. This can be carried out e.g. during an ongoing call and is called handover or hand-off.

By means of FIG. 1, a handover method in accordance with the present invention will be explained, which method aims at avoiding that calls are handed over to a radio base station that in an area (island) certainly has a high signal quality value but that for some reason still is not suitable to be the radio base station that handles the call. Said areas are islands in cells where radio signals are received with higher quality from a radio base station that is located outside and comparatively far from the area where the island in question is located.

To clarify the explanation of the present invention, a known handover method will also be described with reference to FIG. 1.

FIG. 1 shows a mobile radio system 100 which comprises three radio base stations: RBS1, RBS2, RBS3. The radio base station RBS1 has an associated cell C1, the radio base station RBS2 has a cell C2, and the radio base station RBS3 has a cell C3. Due to e.g. terrain variations, a first island 102 is formed in the cell C2, where there are better transmission and reception conditions for a mobile terminal 101 relative to the radio base station RBS1 than to the radio base station RBS2 despite the fact that the latter radio base station RBS2 is located closer to said first island 102.

When the mobile terminal 101 moves from its present position A in a direction 104 towards a position B, the mobile terminal 101 gradually enters the first island 102. When passing into the first island 102, in a known method, a handover is performed to the radio base station RBS1 in view of better transmission and reception conditions for the mobile terminal 101 relative to this radio base station RBS1 than to the radio base station RBS2. The mobile terminal 101 moves further on in the direction 104, leaves the first island 102 and again enters into the area of the cell C2 where there are better reception conditions relative to RBS2 wherein handover to this base station is performed. When the mobile terminal 101 passes into the cell C3, handover to the radio base station RBS3 is performed.

Handover causes a load on the mobile radio system due to the fact that it requires comparatively much signaling. By utilizing the present invention to avoid handover to islands of the type described above, i.e. to islands that are far away from the radio base station that has given rise to the respective island, the load on the system will be reduced. Since each handover also constitutes an increased risk of losing an ongoing call, also this risk will be reduced by the present invention. The interference and the path loss can drastically increase when a mobile terminal is set up to a radio base station which is located far away therefrom and since this is avoided by means of the present invention, further advantages will thus be obtained.

There is a further island 103 that is closer to the radio base station RBS2 than RBS1 but in which there are better transmission and reception conditions with the radio base station RBS1 than with the radio base station RBS2. However, this island is comparatively close to the radio base station RBS1 (in comparison with the island 102) and when the mobile terminal 101 enters this second island 103, a handover to the radio base station RBS1 is performed also when utilizing a preferred embodiment of the present invention. This type of handover is performed by the present invention in view of the nearness of the island to the radio base station from which the island originates.

The quality measure that a mobile radio system utilizes to be able to decide whether or not to perform a handover can be of many different kinds but the most common are: signal strength, bit error rate and signal/interference ratio (C/I). To facilitate the description, in the following, reference will only be made to a preferred case where signal strength is used as quality measure, but anyone skilled in the art realizes that there can be a large number of different quality measures that can be used in connection with the present invention without in any respect changing the basic conditions for the present invention. When the mobile terminal 101 is in contact with the mobile radio system 100, it carries out signal strength measurements on signals that are transferred between the mobile terminal 101 and all radio base stations RBS1, RBS3 that are listed in a neighboring cell list assigned to the mobile terminal 101, and between the mobile terminal 101 and the radio base station RBS2 that forms the active cell for the mobile terminal 101. Radio base stations in the neighboring cell list are called neighboring radio base stations or neighboring cells. If e.g. the cell C2 is active cell for the mobile terminal 101, the cells C1, C3 are listed in said neighboring cell list as candidates for handover. In a digital mobile radio system, the signal strength measurement is carried out e.g. with respect to the neighboring cells by the mobile terminal on radio signals transmitted from the radio base stations, i.e. on downlink signals, and for the active cell of the mobile terminal the measurement is carried out by the radio base station in the active cell on radio signals transmitted form the mobile terminal, i.e. on the uplink signal. The measured signal strengths obtained in the mobile terminal 101 are transferred by the mobile terminal to the mobile radio system via the radio base station of the active cell. Thus, the mobile radio system has information about all signal strengths for the radio base stations that are candidates for handover of the mobile terminal 101. In an analog mobile radio system, the system obtains corresponding signal strengths by measuring the signal strength from the mobile terminal to all radio base stations, i.e. on uplink signals, that are listed in the neighboring cell list. The present invention is not dependent on how the measurement of the signal strengths is carried out but only on that it is carried out.

A known algorithm to evaluate the signal strength and arrive at a decision about a possible handover to a certain candidate cell is to compare the signal strength for the candidate cell with the signal strength for the active cell added to a hysteresis value as follows: SScand≧SSactive+hyst1. Said signal strengths are measured e.g. in decibel in relation to 1 mW, i.e. that the unit of the measured signal strengths is dBm. The comparison is carried out at regular intervals for all candidate cells. A hysteresis value Hysti is utilized to avoid performing handover back and forth between two radio base stations when a mobile terminal moves along the border between the two cells in question. Then, handover is performed when the mobile terminal for sure is located inside the candidate cell and probably will not directly need to perform handover back to the previously used radio base station. For the mobile radio system 100 where the cell C2 is active cell, and C1 and C2, respectively, are neighboring cells to C2 and thus handover candidates, at the signal strength measurement, the signal strengths $SS_{C1}$, $SS_{C2}$, $SS_{C7}$ are obtained. Each signal strength originates from the respective radio base station RBS1, RBS2, RBS3. With these measured signal strengths, the following comparisons are carried out:

$SS_{C1} \geq SS_{C2}+Hyst1$ and $SS_{C3} \geq SS_{C2}+hyst1$, at regular intervals to decide about a possible handover.

In accordance with the present invention, a handover value is considered according to SScand≧SSactive+ handover value. The handover value is a value which essentially is dependent on the measured signal strengths from the different candidate radio base stations and the relations values between the candidate cells. The dependence is such that high signal strength values and low relation values increases the handover value and thereby puts more refined requirements on the signal strength transmitted by the candidate radio base station in order for handover to be performed than what is the case in accordance with the prior art. In an embodiment of the invention, the hysteresis value hyst1 known as above can be added.

Now, the term neighboring cell relation will be briefly explained. The neighboring cell relation is a value which is dependent on the probability for a handover to be performed between two radio base stations. This probability can e.g. be defined as the average number of handovers performed during a certain period of time, that e.g. can be twenty-four hours or a month. This value can change when the number of handovers performed from a first radio base station to a second radio base station during the specific time period, changes. The probability for a handover to be performed from the first radio base station to the second radio base station does not have to be equal to the probability for a handover to be performed from the second radio base station to the first radio base station. A high value corresponds to a high probability for handover between two radio base stations, i.e. many handovers have been performed earlier between these radio base stations, and a low value corresponds to a low probability for handover to be performed. Neighboring cell relation values can e.g. be summed up in a matrix Q in the following manner for the mobile radio system 100 shown in FIG. 1:

$$Q_3 = \begin{bmatrix} \cdot & q12 & q13 \\ q21 & \cdot & q23 \\ q31 & q32 & \cdot \end{bmatrix}.$$

Each element in a row in the matrix Q3 corresponds to the probability for handover from a radio base station to any other radio base station in the mobile radio system 100. In e.g. row 2 in the matrix Q3, a first neighboring cell relation value q21 corresponds to the probability for handover to be performed from the radio base station RBS2 to the radio base station RBS1, and a second neighboring cell relation value q23 corresponds to the probability for a handover to be performed from the radiobase station RBS2 to the radio base station RBS3. A neighboring cell relation value q32 in row 3 which corresponds to the probability for a handover to be performed from the radio base station RBS3 to the radio base station RBS2 is not necessarily as high as the neighboring cell relation value q23. For some reason, more handovers can e.g. have been performed from the radio base station RBS2 to the radio base station RBS3 than in the opposite direction.

For a mobile radio system with n radio base stations, the probability for handover between all the radio base stations of the mobile radio system is described by the following matrix:

$$Q_n = \begin{bmatrix} \cdot & q12 & q1n \\ q21 & \cdot & \cdot \\ qn1 & \cdot & \cdot \end{bmatrix}.$$

The values in the matrix Qn can be utilized in different ways, one way being to convert the matrix into a matrix Q' where the values are calculated as follows:

$$q''_{ij} = aq_{ji} + (1-a)q_{ji},$$

where $0 \leq a \leq 1$.

The definition of relation value as indicated above is merely an example of a possible relation value since there is a large number of different definitions of relation value that can used without affecting the basis for the present invention. Neither is it necessary to describe the relations in the form of a matrix but other descriptions can be used.

Another way to determine the relation values is to utilize the geometric relationship between the different radio base stations. The simplest possible case is simply measuring the distance between the different radio base stations and using this distance as a starting point for calculating the relation value. There are of course a larger number of different ways of determining the relation values by utilizing the geometry of the system, which should be obvious to anyone skilled in the art when reading the present patent application. Different ways of calculating the relation values can of course give rise to different values thereon.

Another way of measuring neighboring association is that the mobile radio system calculates the attenuation of radio signals received by the mobile terminal, that have been transmitted from the radio base stations. The attenuation is defined as the quotient between the power of a received radio signal and the power transmitted by the radio base station. Then, the inverse of the attenuation is compared. If a mobile receives radio signals where the inverse of the attenuation is large for two compared radio signals, it is probable that these two are neighbours. By deciding that there is a neighboring relation between two radio base stations when the inverse of the attenuation of two radio signals transmitted from said radio base stations exceeds e.g. 80 dB, a measure on neighboring cell relations is obtained in analogy with the above, and a Qn matrix as above can be formed.

Neighboring cell relations as a term has been proposed and described in U.S. patent application Ser. No. 08/609422 and PCT application PCT/SE97/00328.

The relation values can also be defined as being constant, i.e. fixed to certain values.

A method in accordance with the present invention will now be described more in detail by means of an exemplifying embodiment. In the example, it is supposed that the active cell is cell C2. When the mobile terminal 101 is in contact with the mobile radio system 100 and is located in the cell C2, signal strength measurements are thus carried out between the radio base stations RBS1, RBS2, RBS3 and the mobile terminal 101 and the signal strengths are compared in accordance with: $SC_{C1} \geq SS_{C2}+hyst1+$ handover value and $SS_{C3}+: SS_{C2}+hyst1+$handover value. For reason of simplicity, the comparison of signal strengths is explained merely by analyzing the inequality: $SS_{C1} \geq SS_{C2}+hyst1+$ handover value when the mobile 101 approaches the first island 102.

When the mobile terminal 101 is present in the cell C2, the handover value in the inequality $SS_{C1} \geq SS_{C2} \geq +hyst1+$ handover value depends on a quotient where $$\frac{SS_{C3}}{q_{31}}$$

where $SS_{C3}$ is the signal strength from the radio base station RBS3 and $q_{31}$ is the neighboring cell relation between the cell C3 and the cell C1, i.e. the probability for a handover to be performed from the radio base station RBS3 to the radio base station RBS1.

Suppose that the mobile terminal 101 approaches the first island 102. The quotient $$\frac{SS_{C3}}{q_{31}}$$

will be comparatively high since $SS_{C3}$ has a comparatively high value and $q_{31}$ has a comparatively low value. Thereby, the handover value will be comparatively high due to the fact that the quotient $$\frac{SS_{C3}}{q_{31}}$$

is comparatively high. Since the handover value is high, no handover to the radio base station RBS1 will be performed when the mobile terminal moves into the first island 102.

When the same mobile terminal 101 is at the border of the second island 103, also in this case, it is the inequality $SS_{C1} \geq SS_{C2}$+hyst1+handover value that decides whether a possible handover is to be performed. The handover value is also now determined by the quotient $$\frac{SS_{C3}}{q_{31}}.$$

Since the signal strength $SS_{C3}$ from the radio base station RBS3 in this case has a low measured value $q_{31}$ and even if the relation value is comparatively low, the handover value will be comparatively low. Thus, a handover is performed to the radio base station RBS1 when the mobile terminal moves into the second island 103. The reasoning for the value of the handover value is analogous for situations when the mobile terminal 101 moves into the cell C1 or the cell C3.

Figure 2:
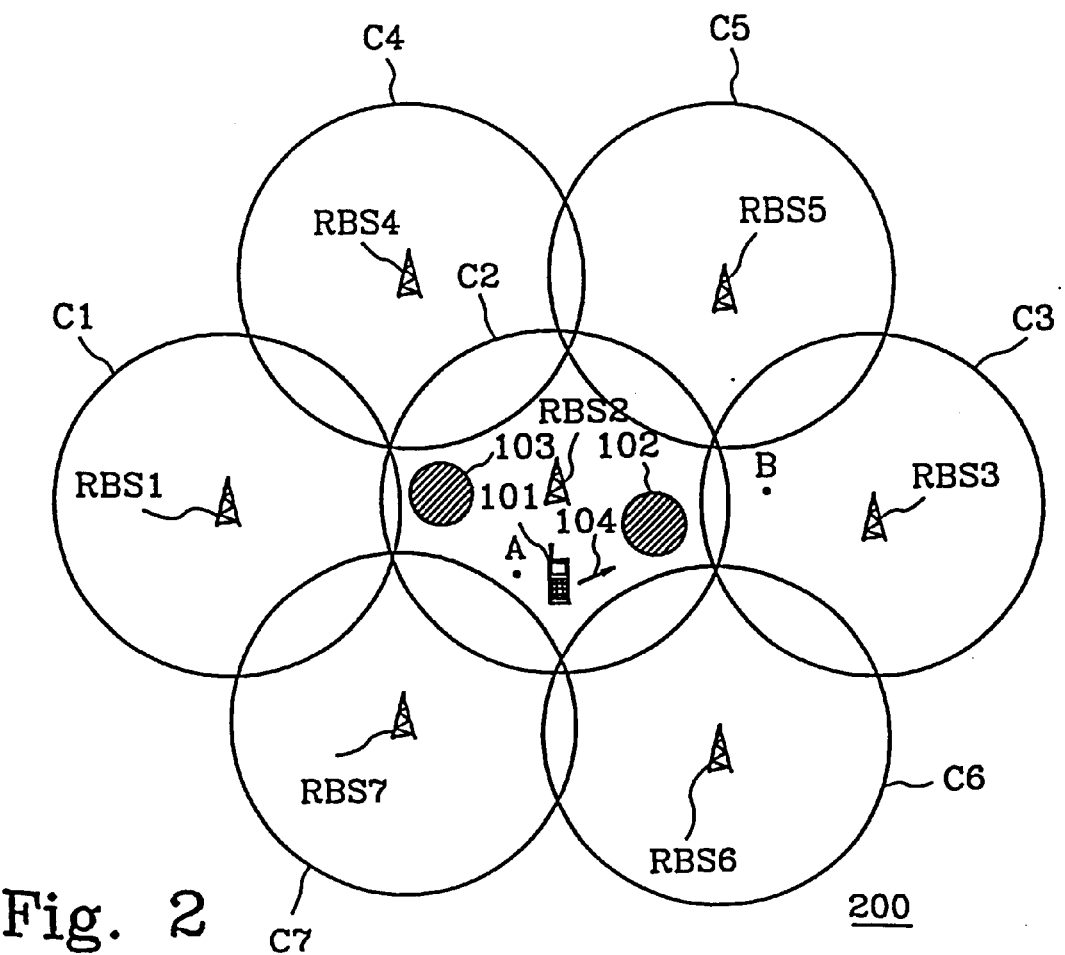
FIG. 2 shows a mobile radio system.

FIG. 2 shows a part 200 of a mobile radio system in conformity with FIG. 1. FIG. 2 shows a cell C2 having six neighboring cells C1, C3, C4, C5, C6, C7. Each cell has a respective radio base station RBS1, RBS2, RBS3, RBS4, RBS5, RBS6, RBS7 each intended for the radio communication in a corresponding cell. For reason of simplicity, so called omnicells are shown. It is obvious that the present invention is also applicable to mobile radio systems having so called sector cells.

When the mobile terminal 101 is present in the cell C2, in the analysis to determine whether a possible handover is to be performed, all measured signal strengths $SS_{C1}$, $SS_{C2}$, $SS_{C3}$, $SS_{C4}$, $SS_{C5}$, $SS_{C6}$, $SS_{C7}$, and all corresponding neighboring cell relations are taken into consideration.

As an example, it shall now be shown how the analysis is carried out when the mobile terminal 101 passes into the first island 102 in the cell C2. The inequality $SS_{C1} \geq SS_{C2}$+hyst$_1$+handover value is in this scenario the condition that has to be fulfilled in order for a handover to be performed to the radio base station RBS1. When calculating the handover value, the following quotients between signal strengths and relation values are taken into consideration:

$$\frac{SS_{C3}}{q_{31}}, \frac{SS_{C4}}{q_{41}},$$

$$\frac{SS_{C5}}{q_{51}}, \frac{SS_{C6}}{q_{61}} \text{ and } \frac{SS_{C7}}{q_{71}}$$

The reasoning above what concerns the size of the quotients in the mobile radio system 100, is valid also in this connection.

In order to get a well defined and controllable area within which the quotients mentioned above correspond to a value, a so called saturation function is used. An example of such a function is a tangent hyperbolicus function and then, e.g. the following can be used:

$$f1(SS, q) = \left(\frac{1}{2} + \frac{1}{2} \times \tanh\left(\frac{SS - x_{01}}{dx_1 \times q}\right)\right);$$

where the function will have values between 0 and $f1_{max}$, $x_{01}$ and $d_{x1}$ are parameters that define the inclination of the linear part of the function and its center coordinates. Examples on typical values of the parameters $x_{01}$ and $d_{x1}$ are 80 dBm and $$\frac{a}{\bar{q}},$$

respectively, where $\bar{q}$ is the average value of all elements except the diagonal in the Qn matrix and a is the desired span of the function. A suitable value can e.g. be 5 which leads to that said function has a minimum value of −2,5 and a maximum value of +2,5.

All five above-mentioned quotients give a functional value of $f_1$, which values are summed and the sum obtained is multiplied by a standardization factor that is equal to 1/(the number of terms in the sum). This can be summarized by the following expression:

$$\frac{1}{5} \times \sum_{i=3}^{7} f1\left(\frac{SS_i}{q_{il}}\right).$$

In order to get a well defined and controllable area within which the above mentioned summation and standardization correspond to a value, said handover value, e.g. the same saturation function as above is used which gives:

$$\text{handover value} = \left(\frac{1}{2} + \frac{1}{2} \times \tanh\left(\frac{\frac{1}{5} \times \sum_{i=3}^{7} f1\left(\frac{SS_i}{q_{il}}\right) - x02}{dx2}\right)\right) \times f2 \text{ max};$$

where the function will have values between 0 and $f2_{max}$, $X_{02}$ and $d_{x2}$ are parameters that define the inclination for the linear part of the function and its center coordinates. Examples on typical values of the parameters are $f2_{max}$, $x_{01}$ and $d_{x1}$ are 3–6, 0.5 and 1, respectively.

When a mobile terminal is present in a cell k that has a corresponding radio base station k and n neighbouring cells having n radio base stations in the neighboring cell list and wishes to compare measured signal strength from the radio base station k (active cell) with a measured signal strength from a radio base station j which possibly can be a handover candidate, the following comparison is carried out: SSj≧SSk+hyst1+handover value, where the handover value is calculated in accordance with:

$$(1) \quad A = \sum_{i=1}^{n} f1\left(\frac{SS_i}{qi1}\right),$$

where i≠k and i≠j and $f_1$ are defined as above.

$$(2) \quad \text{handover value} = \left(\frac{1}{2} + \frac{1}{2} \times \tanh\left(\frac{\frac{1}{n-1} \times A - x02}{dx2}\right)\right) \times f2 \max,$$

where $f2_{max}$, $x_{02}$ and $d_{x2}$ are defined as above.

Figure 3:
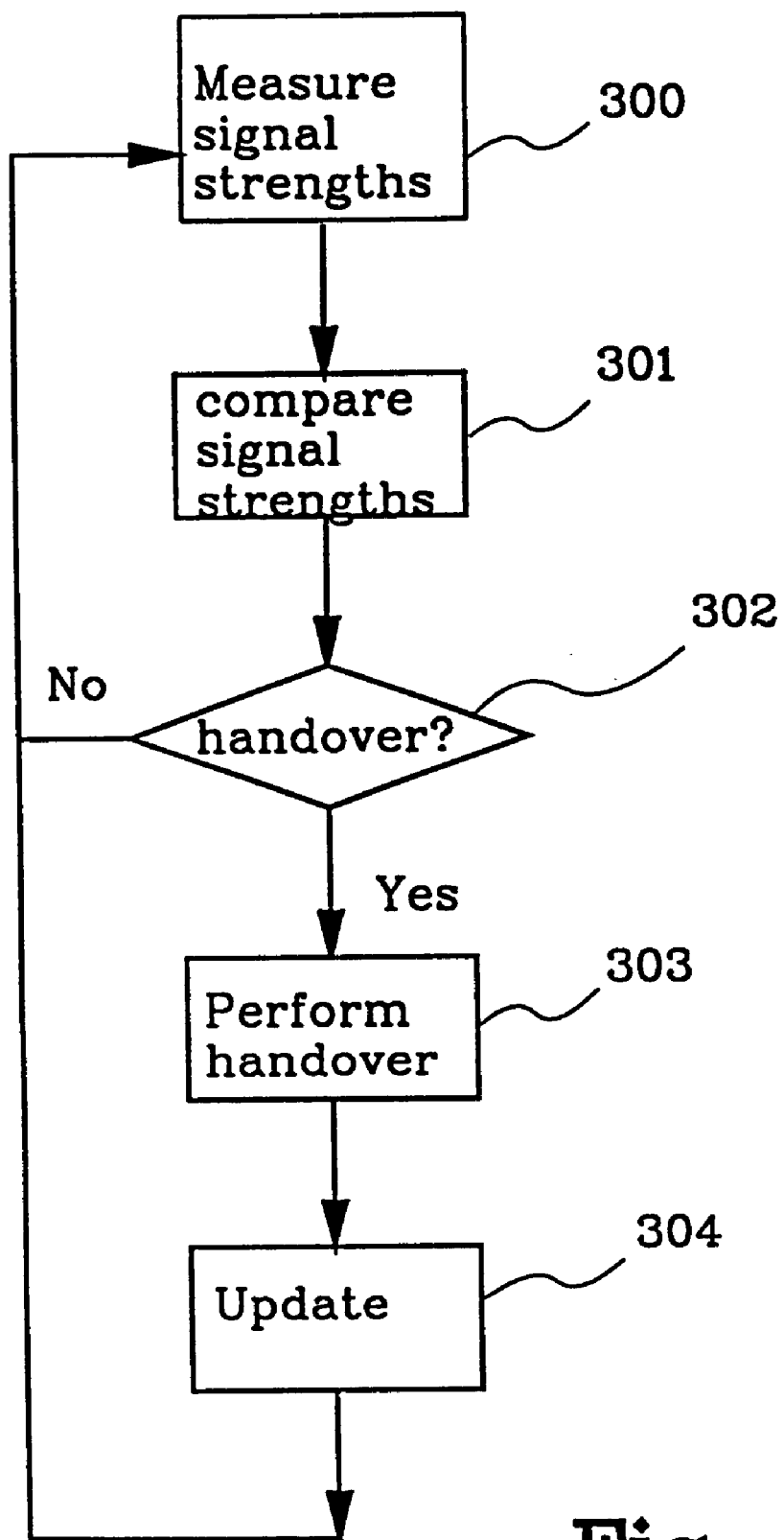
FIG. 3 shows a flowchart for a handover.

FIG. 3 is a flow chart which illustrates one embodiment of a handover method. When a call is set up between the mobile terminal 101 and the radio base station RBS2, in a step 300, all signal strengths are measured between the mobile terminal 101 and the radio base stations RBS1, RBS3, RBS4, RBS5, RBS6 and RBS7 of the neighbouring cells of its active cell and between the radio base station RBS2 and the mobile terminal 101 wherein the signal strengths $SS_{C1}$, $SS_{C2}$, $SS_{C3}$, $SS_{C4}$, $SS_{C5}$, $SS_{C6}$ and $SS_{C7}$ are obtained. The signal strength $SS_{C1}$, $SS_{C3}$, $SS_{C4}$, $SS_{C5}$, $SS_{C6}$ and $SS_{C7}$ of all neighbouring cells are compared with the signal strength $SS_{C2}$ from the radio base station of the active cell in a step 301 in accordance with the principle explained above. In a step 302, it is checked whether any of the conditions is fulfilled. In accordance with an alternative "no", no handover is performed and a new signal strength measurement is carried out in step 300 after that a predetermined time interval has elapsed. In a step 303, handover is performed in accordance with a known method to a new radio base station or a new cell and in a step 304, the mobile radio system and the mobile terminal 101 are updated. The mobile terminal will e.g. get a new neighbouring cell list. When a handover has been carried out, also the value of the relation value is updated in the mobile radio system, in which value the handover just performed, is included.

The method can also be used when the mobile telephone is in "idle mode", i.e. switched on and in contact with a mobile radio system but not set up for a call. Then, the mobile terminal has information about which cell it prefers.

The method in accordance with the invention can also be used in mobile radio systems designed with CDMA technology (Code Division Multiple Access). Each mobile terminal is set up to one or more radio base stations. These radio base stations are denoted actively set in a CDMA system. The method according to the invention is thus applicable when choosing which radio base stations are to be included in the active set of a mobile terminal.

Of course, the invention is not restricted to the embodiments described above and illustrated on the drawing but can be modified within the scope of the appended claims.

What is claimed is:

1. A method of handover in a mobile radio system having radio base stations with associated cells, and at least one mobile terminal, comprising the steps of:
    measuring a quality measure of radio signals transferred between at least some of the radio base stations and the mobile terminal,
    performing a handover of the mobile terminal from a first radio base station to a second radio base station, and
    wherein said handover is performed utilizing a handover value depending on said quality measure and relation values between radio base stations whose respective cells are neighboring cells to a cell of the first radio base station, said relation values based on a probability for said handover to be performed between at least two of the radio base stations relative to each other, said relation values being essentially independent of said quality measure.

2. The method according to claim 1, wherein said relation values are dependent on the number of times handover has been performed between the respective radio base stations whose respective cells are neighboring cells to the cell of the first radio base station during a predetermined period of time.

3. The method according to claim 1, wherein said relation values are dependent on a measured or calculated radio wave transmission condition in the cells, preferably an attenuation of radio waves between different points in the cells that are neighboring cells to the cell of the first radio base station.

4. The method according to claim 1, wherein said relation values are dependent on a geometric relationship between said cells, preferably a distance relationship between the respective radio base stations whose respective cells are neighboring cells to the cell of the first radio base station.

5. The method according to claim 1, wherein said quality measure is a signal strength measure.

6. The method according to claim 5, wherein said handover value is a non-decreasing function of signal strength measure.

7. The method according to claim 5, wherein said handover value is a non-increasing function of said relation values.

8. The method according to claim 1, wherein said quality measure is a bit error ratio.

9. The method according to claim 1, wherein said quality measure is a signal/interference relation.

10. A system for mobile radio with radio base stations, having associated cells, and a mobile terminal, the system comprising:
    measurement means adapted to measure a quality measure of radio signals transmitted between at least some of the radio base stations and the mobile terminal,
    handover means adapted to perform handover of the mobile terminal from a first radio base station to a second radio base station,
    storage means adapted to store relation values between radio base stations whose respective cells are neighboring cells to a cell of said first radio base station,
    calculating means adapted to form a handover value which is dependent on said quality measure and said relation values based on a probability for said handover to be performed between at least two of the radio base stations relative to each other, said relation values being essentially independent of said quality measure, and
    wherein said handover means is adapted to perform handover utilizing said handover value.

11. The system according to claim 10, wherein said relation values are dependent on the number of times handover has been performed between the respective radio base stations whose respective cells are neighboring cells to the cell of the first radio base station during a predetermined period of time.

12. The system according to claim 10, wherein said relation values are dependent on a measured or calculated radio wave transmitting condition within the cells, preferably an attenuation of radio signals between different points in the cells that are neighboring cells to the cell of the first radio base station.

13. The system according to claim 10, wherein said relation values are dependent on a geometric relation between the cells, preferably a distance relation between the radio base stations whose respective cells are neighboring cells to the cell of the first radio base station.

14. The system according to claim 10, wherein said measurement means is adapted to measure a signal strength.

15. The system according to claim 14, wherein said calculating means is adapted to form said handover value as a non-decreasing function of said signal strength.

16. The system according to claim 14, wherein said calculating means is adapted to form said handover value as a non-increasing function of said relation values.

17. The system according to claim 10, wherein said measurement means is adapted to measure a bit error ratio.

18. The system according to claim 10, wherein said measurement means is adapted to measure a signal/interference relation.

19. The system according to claim 10, wherein said measurement means is associated with the mobile terminal.

20. The system according to claim 10, wherein said calculating means is associated with the mobile terminal.

21. The system according to claim 10, wherein said calculating means is associated with at least one of the radio base stations.

22. The system according to claim 10, wherein said storage means is associated with at least one of the radio base stations.

* * * * *